United States Patent [19]

Feigt et al.

[11] Patent Number: 4,541,017

[45] Date of Patent: Sep. 10, 1985

[54] APPARATUS FOR CONTACT-FREE MEASUREMENT OF ELECTRICAL CHARGE IMAGES GENERATED BY ELECTRO-RADIOGRAPHIC RECORDING METHODS

[75] Inventors: Ingmar Feigt, Erlangen; Wolfram Wersing, Kirchheim, both of Fed. Rep. of Germany

[73] Assignee: Siemens Aktiengesellschaft, Berlin & Munich, Fed. Rep. of Germany

[21] Appl. No.: 513,011

[22] Filed: Jul. 12, 1983

[30] Foreign Application Priority Data

Aug. 2, 1982 [DE] Fed. Rep. of Germany ....... 3228833

[51] Int. Cl.³ .............................................. H04N 1/02
[52] U.S. Cl. ...................................... 358/295; 378/28
[58] Field of Search .............. 358/294, 295, 111, 300; 355/3 R; 250/310; 378/28, 29, 31, 32; 324/76 R, 158, 109, 123

[56] References Cited

U.S. PATENT DOCUMENTS

| | | | |
|---|---|---|---|
| 3,737,569 | 6/1973 | Snelling | 358/295 |
| 4,134,137 | 1/1979 | Jacobs et al. | 358/295 |
| 4,319,284 | 3/1982 | Kiess et al. | 358/294 |

FOREIGN PATENT DOCUMENTS 3121494  1/1983  Fed. Rep. of Germany .

OTHER PUBLICATIONS

Stoffel, J. C. "Surface Relief Electrometer Type Scanner" Xerox Discl. Journal, vol. 6, No. 5, 9–10/81.
Stoffel, J. C., et al., "Microelectrometer Raster Input Scanner" Xerox Discl. Journal, vol. 6, No. 5, 9–10/81.
"Electrophotography", Schaffert, 1975, pp. 191–201 and 950–952.
"Development of a Large-Area Solid-State Image Receptor for X-Ray Images," Xerox Corp. Technical Annual Report, Oct. 1978, M. Ein–Gal, Mgr.
"Semiconductor Surfaces," Many et al, 1971, pp. 274–275.

Primary Examiner—Howard W. Britton
Assistant Examiner—Edward L. Coles
Attorney, Agent, or Firm—Hill, Van Santen, Steadman & Simpson

[57] ABSTRACT

An apparatus for contact-free measurement of electrical charge images of the type generated on a storage plate as transmission images by means of electro-radiographic recording methods has a matrix of dynamically functioning probes, such as Kelvin probes, for scanning the effect of the electrostatic induction caused by the image on the storage plate, the outputs of the probes being amplified and supplied to a display device such as a picture screen. The individual probes of the matrix are electrically conductive elements and a mechanical oscillation is generated between the charge image and the probes in the field to be measured either by oscillating the probes or by oscillating the storage plate. The charge amounts electrostatically induced in the probes are tapped as the image signals.

14 Claims, 14 Drawing Figures

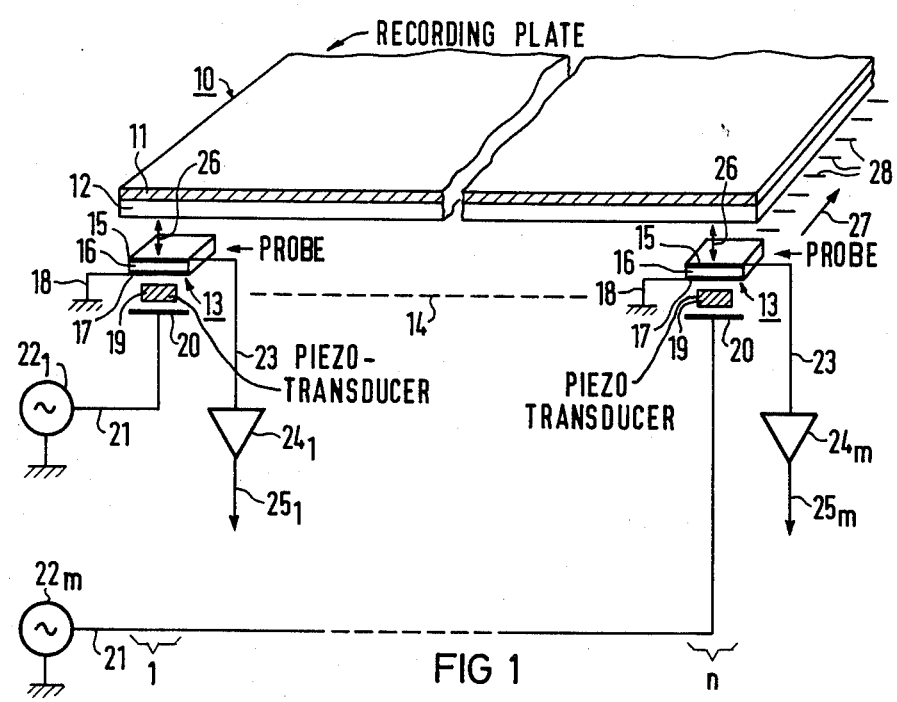
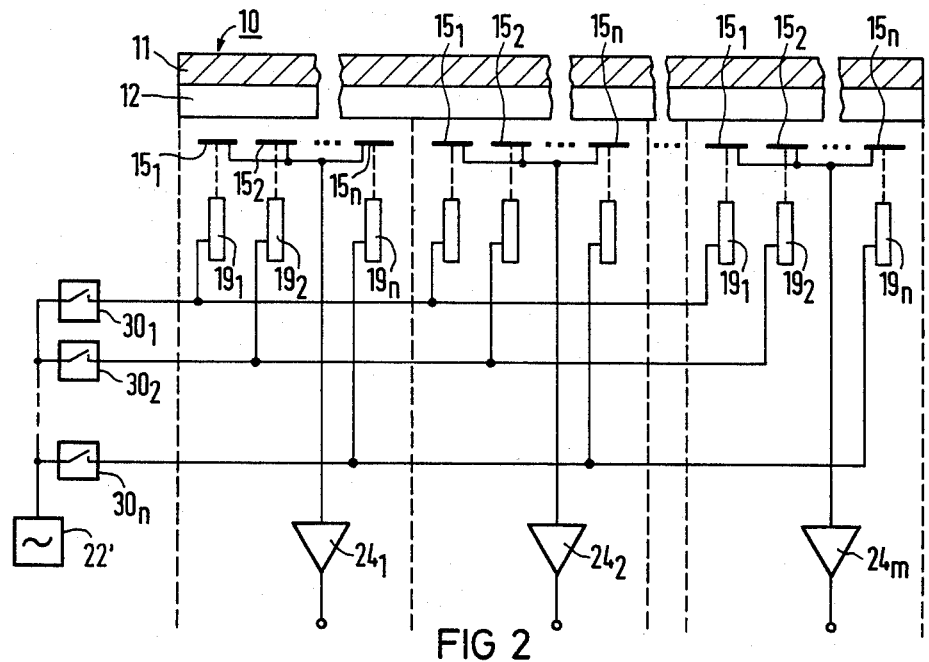

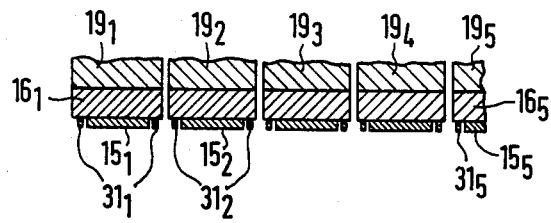
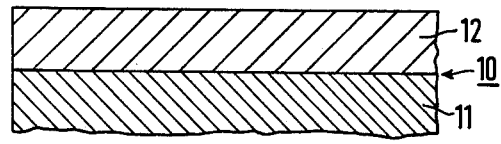
FIG 3
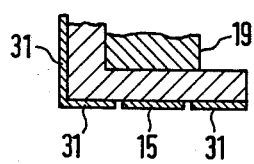
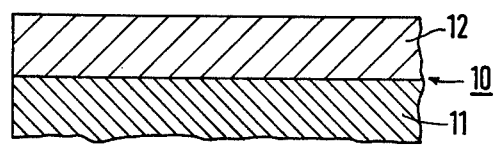
FIG 4
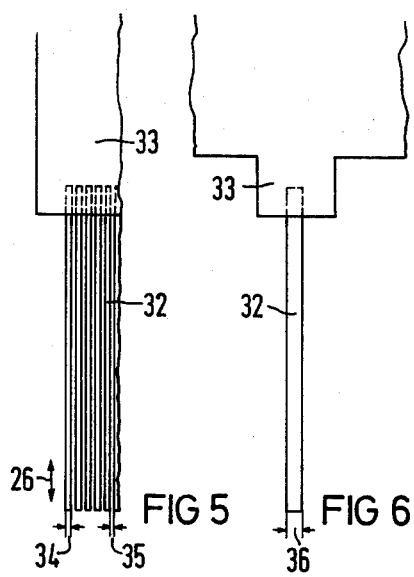
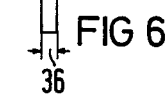
FIG 5    FIG 6
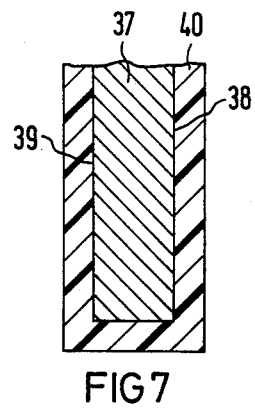
FIG 7
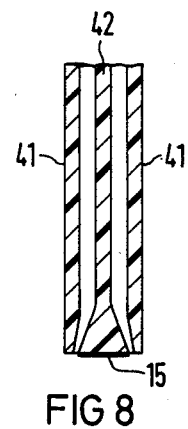
FIG 8

APPARATUS FOR CONTACT-FREE MEASUREMENT OF ELECTRICAL CHARGE IMAGES GENERATED BY ELECTRO-RADIOGRAPHIC RECORDING METHODS

BACKGROUND OF THE INVENTION

1. Field of the Invention

The present invention relates to devices for contact-free measurement of electrical charge images, and in particular to such an apparatus employing a probe matrix and a means for generating mechanical oscillation of the probe matrix and the charge image relative to each other, the charge thereby electrostatically induced in the individual probes being utilized as an image signal.

2. Description of the Prior Art

Electro-radiographic recording methods wherein a charge image is stored on a high-resistant surface are frequently employed for storing radiation-induced images such as optical images or x-ray images as described, for example, in "Electrophotography," R. M. Schaffert, The Focal Press (1975), pages 191–201. The high-resistant surface may consist, for example, of photoconductive crystals such as a selenium plate. After inital charging, such a plate is modulated during discharge by the incident radiant energy to be imaged. The radiation transmission image is thereby converted into a stationary charge image on the surface of the plate. Another method known as ionography can be used for generating a charge image. Ionization is generated within a volume by the radiant energy to be imaged, and the charged particles are then collected on an electrically insulating surface as a charged image. For generating a visible image, a charged image generated according to the above known methods is subjected to a developing method such as, for example, the application of a coloring pigment powder. Such conventional developing methods, however, have the disadvantage that the charge image on the storage plate is usually lost and further action on the reproduction so as to enhance the reproduction is no longer possible.

Another approach, particularly utilized in medical diagnostics, subjects the electronic charge images on an insulating surface to a high-resolution evaluation before development without the charge distribution, and thus the possibility of producing a direct visible image thereof, being destroyed. It is a problem in the relevant technology to combine electronic image evaluation methods with conventional electro-radiography such as, for example, a combination of computer radiography and electro-radiography as well as pre-development evaluation of optical "xerograohic" methods employing laser printers and the like. If such a combination can successfully be realized an image high in gray scales, for example, could first be electronically produced before the charge image is supplied to a destructive copying process. Computer evaluation of an existing charge image would then also be possible.

A method for non-destructive scanning of charged images by means of an array or matrix comprised of constant potential probes connected to further measuring means which exploits the electrostatic induction caused by the charge image is described in the treatise "Development Of A Large Area Solid-State Image Receptor For X-Ray Images," M. Ein-Gal, Xerox Corporation Technical Annual Report, #NO1-CB-74211-35, October 1978. According to this method, 128 coaxial wires function as contact-free electrostatic induction potential probes. The wires are connected to suitable amplifiers, the output signals of which are subjected to multiplexing and analog-to-digital conversion, and are finally supplied to a computer for processing thereof. Because of the size of the discrete components and the large number of wires, the length and degree of resolution of this known sensor array is inherently limited, thus requiring scanning in an x-y motion pattern. A further disadvantage that this known system exhibits an extreme sensitivity to external influences (microphony sensitivity) because of the interposition of the long wires as well as unstable functioning of the receiver arrangement.

A proposed solution to the problem of non-destructive reading of the electric charge image pattern is described in German Pat. No. 3,121,494 (corresponding to pending U.S. application Ser. No. 377,085 filed on May 10, 1982; L. Risch et al) now U.S. Pat. No. 4,486,778. The apparatus disclosed therein employs a simpler and more precisely functioning measuring means in the form of a matrix of integrated metal-oxide-semiconductor (MOS) components each having a floating gate or a switched floating gate. The elements of the matrix are positioned so as to monitor the local charge condition of the charge image by means of the effect of the electrostatic induction generated by the charge image, which causes the conductivity of the matrix elements to vary accordingly, the measured value being simultaneously amplified.

All of the above measurement systems employ stationary probes wherein a strict dependency of the measured results on the distance from the charged plates exists for a given constant potential measurement for identifying the stationary charge image. This characteristic complicates accurate recognition of nonhomogenious fields and requires high manufacturing tolerances for maintaining a constant spacing of the matrix relative to the surface on which the charge image is generated. Additionally, it is desirable to supress the unavoidable background dc potential by means of superposition of a locally dependent variable potential, however, such is not possible within the framework of the known systems. Lastly, these known systems require high-resistant static electrometer amplifiers which are subject to drift, offset and microphony.

SUMMARY OF THE INVENTION

It is an object of the present invention to provide an apparatus for contact-free measurement of an electrical charge image in a manner permitting high-resolution evaluation of the image without destruction of tne charge image.

It is a further object of the present invention to provide such a measurement apparatus which eliminates the dependency of the measurement on spacing fluctuations between the charge image and the measurement probes due to mechanical tolerances.

A further object of the present invention is to provide such an apparatus which avoids amplifiers exhibiting significant drift and offset voltages.

The above objects are inventively achieved in an apparatus wherein a probe matrix consisting of, for example, a plurality of Kelvin probes, is employed and wherein mechanical oscillations are generated between the probe matrix and the charge image, either by oscillating the surface on which the charge image exists or by oscillating the probes comprising the matrix. The charge generated in the probes by the electrostatic induction effect of the charge image is amplified and utilized to form a visible reproduction of the charge image.

Dynamic potential probes of the type suitable for use in the apparatus disclosed and claimed herein are known as Kelvin probes and are described, for example, in "Semiconductor Surfaces," Many, Goldstein and Grover, 1971, pages 273-274. The problem of spacing fluctuations between the charge image and the probes can be eliminated with suitable processing means such as, for example, the use of peak detectors. Conventional problems of drift and offset voltages exhibited by electrometer amplifiers utilized in known systems, as well as external microphony are eliminated because the apparatus disclosed and claimed herein operates in the kilohertz range.

In accordance with the principles of the present invention, it is preferable to utilize a dynamically functioning probe array or matrix for electronically scanning the charge images. The array may be comprised of probes disposed next to each other in a row, the row of probes being linearly moved across the charge image so that the image is scanned line-by-line.

Scanning of the image points of a line may also be undertaken serially in groups. The number of measuring amplifiers required can thus be significantly reduced, because only one measuring amplifier is required for a group of probes. A subdivision of the probes into 100 groups of 10 image points each may be utilized for a line containing 1000 probes, corresponding 1000 image points. The probes for each group can be connected in parallel and activated successively, i.e., the probes are successively excited to oscillate. Piezoelectrical transducers can be employed as a drive means for generating the necessary oscillations. These transducers can be in the form of thickness resonators and/or flexural resonators ("tongue" resonators). Oscillation in the thickness mode is useful up to 100 kHz, whereas flexural oscillation is preferable in the range of 1 through 10 kHz.

After amplification, image signals such as, for example, video signals, can be obtained in a manner well known to those skilled in the art from the potential or field strength values derived from the probes. Such signals can be displayed in a known manner on a picture screen or other electronic imaging system and can thus be opitimized to highlight significant details such as contrast, brightness, imaging scale, and the like or may be matched to special conditions.

DESCRIPTION OF THE DRAWINGS

FIG. 1 is a schematic diagram showing a scanning apparatus constructed in accordance with the principles of the present invention.

FIG. 2 is a sectional view with a partial circuit diagram of a scanning device constructed in accordance with the principles of the present invention with the probes arranged in groups.

FIG. 3 is a longitudinal sectional view of a portion of the recording plate and a plurality of probes spaced therefrom.

FIG. 4 is a side cross-sectional view of a portion of the recording plate and a portion of a probe spaced therefrom.

FIG. 5 is a detailed plan view of the arrangement of the probes.

FIG. 6 is an oblique of the probe arrangement.

FIG. 7 is a plan view of a major face of a probe operating in the thickness mode.

FIG. 8 is a view of a minor face of the probe shown in FIG. 7.

DESCRIPTION OF THE PREFERRED EMBODIMENTS

Figure 9:
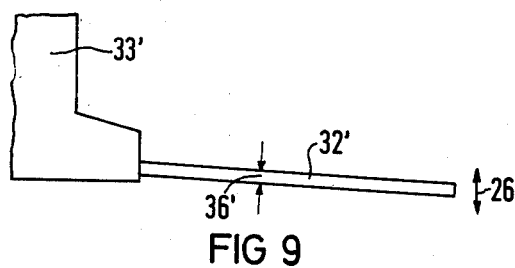
FIG. 9 is a plan view of a probe arrangement operating in the fluxtural mode.
Figure 11:
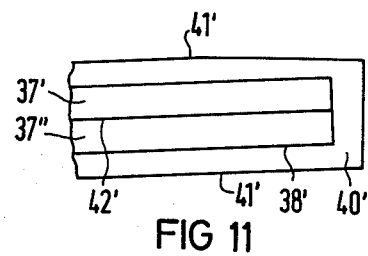
FIG. 11 is a plan view of a major face of a probe operating in the flexural mode.
Figure 10:
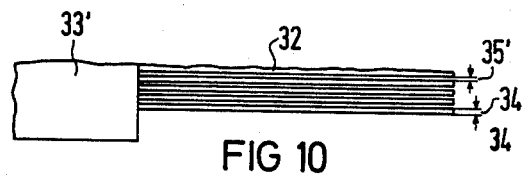
FIG. 10 is an oblique view of the probe arrangement shown in FIG. 9.
Figure 12:
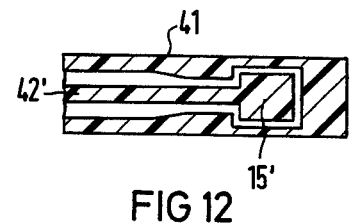
FIG. 12 is a view of a minor face of the probe shown in FIG. 11.

An apparatus for contact-free measurement of a charge image pattern existing on a recording plate 10 is shown in FIG. 1. The recording plate 10 consists of a carrier plate 11 consisting of aluminum, and a photoconductive layer 12 consisting of selenium. The electrostatic charge image which is to be scanned by means of a plurality of probes 13 is situated on the free surface of the layer 12 facing the probes 13. The probes 13 are disposed next to each other in a row 14 indicated with dashed lines at a distance of 10 through 100 $\mu$m in front of the layer 12. As discussed below, the row 14 includes n such probes 13, numbered 1 through n. The probes 13 each consist of an electrode layer 15 consisting of silver having a thickness of 1 $\mu$m and an area of 100 $\mu$m × 100 $\mu$m and an electrically insulating substrate 16 consisting of aluminum oxide having a thickness of 100 $\mu$m and an area coinciding with that of the electrode layer 15. An electrically conductive layer 17, also consisting of silver and having a thickness of 10 $\mu$m, is applied to the substrate 16 opposite the electrode 15. The conductive layer 17 is connected to ground via a line 18. Each probe is also connected to a conventional piezo-oscillator 19 having an electrode 20 connected via a line 21 to an oscillator 22. The electrode 15 is also connected via a line 23 to an amplifier 24 having an output 25 for supplying signals to further processing means for displaying the scanned image.

Only the first and last scanning probes within the row 14 are shown in FIG. 1. The probes omitted between the first and last probes are identically constructed. In the above-described example, wherein the plate 10 has a width and a length of 300 mm, a plurality of 300 probes is employed so that n=300. For generating a scanning signal, oscillation in the direction of the double area 26 is generated by means of the piezo-transducer 19 which is excited by the oscillator drive 22. Activation or cut-in of the probes 13 for conducting a scanning operation occurs successively by successively engaging the oscillators $22_1$ through $22_m$ (in the embodiment shown in FIG. 1, m=n). When scanning of one line is concluded, the probe row 14 is shifted in the direction of area 27 by one line, as indicated by the strokes 28 at the right side of FIG. 1. The entire surface of the selenium layer 12 on which the image to be measured is stored is scanned so that the entire charge image is scanned.

In the embodiment shown in FIG. 1 each probe 13 has an oscillator ($22_1$ through $22_m$) as well as an amplifier ($24_1$ through $24_m$) allocated thereto. A second embodiment wherein the probes 13 are arranged in groups is shown in FIG. 2. Moreover, this embodiment employs only one oscillator drive 22', thus insuring identical oscillations for all of the probes. Successive excitation of the probes is undertaken by switches $30_1$, $30_2$ through $30_n$ interconnected between the respective piezo-transducer $19_1$ through $19_n$ associated with the probes in each group of probes, and the oscillator drive 22'. The respective electrodes $15_1$ through $15_n$ within each group are thus individually actuated in sequence. A signal corresponding to the charge situtated at the surface of the selenium layer 12 associated with each of the sequentially activated probes $15_1$ through $15_n$ of a particular group is emitted through the amplifiers $24_1$ through $24_m$ allocated to each probe group. In the example shown in FIG. 2, n is larger than m, with n=300 and m=10.

Details of the probe structure are shown in cross sectional views in FIGS. 3 and 4, the views being perpendicular to the same plane but at right angles to each other. The probes are disposed a distance from the surface of the selenium layer 12 of the recording plate 10 which may, for example, 150 μm. The electrodes $15_1$ through $15_n$ have a width of 200 μm, so that a resolution of two strokes per mm is achieved. Each electrode is surrounded by a shield grid layer 31 separated from the electrodes by a gap. The grid layer 31 is provided for homogenization of the field and for reducing cross-talk from channel to channel. The centers of the electrodes $15_1$ through $15_n$ are disposed at a distance of 100 μm relative to the layer 12. These distances are identical in the x and y directions.

An embodiment of a probe 32 excitable in the thickness mode is shown in FIGS. 5 through 8. The probes 32 are fixed in a mounting a means 33. Each probe has a width 34 of 0.25 mm with a spacing 35 of 0.05 mm between each probe. Each probe has a length of 10 mm. As can be seen in FIG. 6, the thickness 36 perpendicular to the direction in which the probes 32 are arranged next to one another is substantially greater than the width of each probe, and may be 0.5 mm. As can be seen in FIGS. 7 and 8, each probe consists of a core 37 of piezo-ceramic material which is surrounded on one side by an electrically conductive layer 38 connected to ground, and at the other side by an electrode 39 which is connected to the oscillator drive 22 for exciting the core 37. An insulating layer 40 covers the coatings 38 and 39 and a shielding conductive coating 41 is disposed over the isulating layer 40.

FIG. 7 shows a view of a major face of one of the probes 32, i.e., that face of the probe 32 which faces an identical face of an adjacent probe. A view of a minor face of one of the probes 32 is shown in FIG. 8, showing a lead-in coating 42 for the electrode 15 disposed at the end face of the probe 32, and the shielding coatings 41 disposed at the sides thereof.

Corresponding details for a probe 32' excitable as a flexural resinator are shown in FIGS. 9 through 12, wherein components corresponding to those shown in FIGS. 5 and 8 are identically referenced with primes. The probes 32' are secured in a mounting means 33' and each exhibit a length of 10 mm and width of 0.25 mm with a spacing of 0.5 mm between adjacent probes. Each probe exhibits a thickness of 0.4 mm in the oscillation direction. The probes 32' consist of Piezo ceramic foils 37' and 37" disposed next to one another on a drive electrode 42'. The exterior of the two foils 37' and 37" is surrounded by a electrode layer connected to ground. The resinator arrangement is covered by an insulaing layer 40' and a shielding electrode 41' over the insulating layer 40'. In addition to the shield coating 41', the probe also has a probe coating 15' and a probe-lead in run 42' at its side facing the scanning layer.

Figure 13:
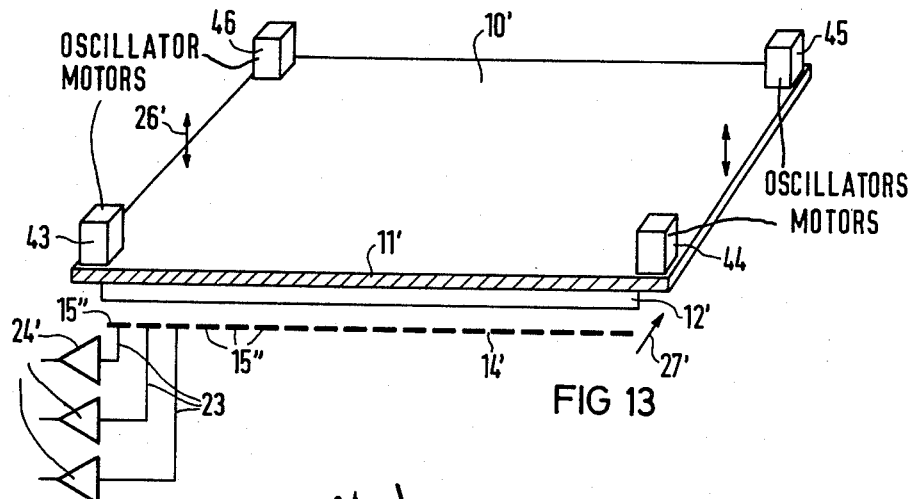
FIG. 13 is a perspective view with a schematic circuit diagram, including selected components only, of a further embodiment of a measuring apparatus constructed in accordance with the principles of the present invention wherein the charge-carrying surface is oscillated.

Another embodiment for the apparatus disclosed and claimed herein is shown in FIG. 13 wherein the electrodes 15" disposed in a row 14' are stationary. In this embodiment oscillating motors 43, 44, 45 and 46 disposed at the corners of the recording plate 10' are utilized to place to the entire plate 10' in oscillation as illustrated by the double arrow 26'. Signals generated by the electrodes 15" are supplied by lines 23 to amplifiers 24'. Movement of the row 14' again occurs stepwise in the direction of the arrow 27'.

Figure 14:
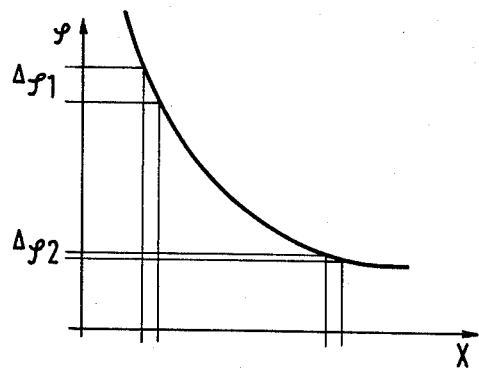
FIG. 14 is a graphical representation of dependency of the electrostatic induction potential as a function of the spacing between a probe and the charge-carrying surface.

A graphical representation of the relationship between the electrostatic induction potential and the spacing between the probe electrode and the recording plate is shown in FIG. 14, with the electrostatic induction potential $\xi$ entered at the ordinate and the spacing x entered at the abscissa. The values shown were obtained with a drive of the probe 13 having a vibratory stroke of 20 micrometers, a frequency of 10 kHz and given a field distribution of 100 volts to be measured on the plate, the probe 13 being at a distance of 100 microns therefrom. As can be seen from FIG. 14, in a homogeneous field the alternating voltage emitted by the electrode 15 depends only on the surface potential and on the vibratory stroke, but not on the absolute position in the field. Tolerances in the spacing distance from the surface of the recording plate 10 therefore exert substantially no influence on the measurement. Moreover, the absolute value of background dc potential can be capacitively decoupled.

Given a non-homogeneous field, a relatively high independence from the distance between the electrode 15 and the recording plate 10 can be achieved by dynamic scanning when the vibratory stroke is selected to be of a sufficient size such as, for example, at least one-tenth of the distance between the surface of the recording plate 10 from the electrodes 15.

Although modifications and changes may be suggested by those skilled in the art it is the intention of the inventors to embody within the patent warranted hereon all changes and modificiations as reasonably and properly come within the scope of their contribution to the art.

We claim as our invention:

1. An apparatus for contact-free measurement of an electrical charge image disposed on a surface of a recording plate of the type generated by electro-static recording methods, said apparatus comprising:
   a probe matrix having a plurality of discrete Kelvin probes, each probe having an electrode for reacting to the effect of electrostatic induction caused by said charge image, said electrodes respectively generating corresponding image signals for processing; and
   a means for inducing mechanical oscillation between said electrodes and said charge image.

2. An apparatus as claimed in claim 1 wherein said means for inducing mechanical oscillation oscillates said probes.

3. An apparatus as claimed in claim 2 wherein said means for inducing mechanical oscillation comprises a plurality of piezo-electric transducers respectively connected to said electrodes and at least one drive means for said transducers.

4. An apparatus as claimed in claim 1 wherein said matrix is a row of said probes.

5. An apparatus as claimed in claim 1 wherein said probes in said probe matrix are arranged in groups.

6. An apparatus as claimed in claim 5 wherein each of the probes in said group are successively oscillated by said means for inducing mechanical oscillation.

7. An apparatus as claimed in claim 1 wherein said probe matrix is periodically moved for scanning the entire surface of said recording plate.

8. An apparatus as claimed in claim 1 wherein said means for inducing mechanical oscillation is a plurality of Piezo ceramic flexural resinators respectively connected to said electrodes for achieving oscillations up to approximately 10 kHz.

9. An apparatus as claimed in claim 1 wherein said means for inducing mechanical oscillation includes a plurality of longitudinal Piezo ceramic resinators excitable in the thickness mode for achieving oscillations up to approximately 100 kHz.

10. An apparatus as claimed in claim 1 wherein each probe has a metal surface functioning as said electrode and connected to an insulating surface and laterally surrounded by a shield grid.

11. An apparatus as claimed in claim 1 wherein said means for inducing mechanical oscillation oscillates said charge image.

12. An apparatus as claimed in claim 11 wherein said means for inducing mechanical oscillation oscillates said charge image by oscillating said recording plate.

13. An apparatus as claimed in claim 12 wherein said means for inducing mechanical oscillation is a plurality of oscillator motors connected to said recording plate.

14. An apparatus as claimed in claim 13 wherein said recording plate is substantially rectangular and wherein said oscillator motors are respectively disposed at the corners of said recording plate.

* * * * *